C. F. AND D. E. McAVOY.
SECTIONAL BUILDING.
APPLICATION FILED JAN. 9, 1919.

1,375,402.

Patented Apr. 19, 1921.
5 SHEETS—SHEET 4.

Inventors:
Charles F. McAvoy, Daniel E. McAvoy
By
Dodge & Sons
Attorneys

UNITED STATES PATENT OFFICE.

CHARLES FREDERICK McAVOY AND DANIEL EDWARD McAVOY, OF LONG ISLAND CITY, NEW YORK.

SECTIONAL BUILDING.

1,375,402.  Specification of Letters Patent.  Patented Apr. 19, 1921.

Application filed January 9, 1919. Serial No. 270,340.

*To all whom it may concern:*

Be it known that we, CHARLES F. MCAVOY and DANIEL E. MCAVOY, citizens of the United States, residing at Long Island City, in the county of Queens and State of New York, have invented certain new and useful Improvements in Sectional Buildings, of which the following is a specification.

This invention pertains to sectional buildings and particularly to what may be termed a unit system of construction, whereby buildings of quite small and of relatively large size may be produced rapidly and economically by employing a smaller or greater number of like units, according to the requirements of individual cases.

The invention aims to provide a ready means of supplying on short notice, buildings suitable for use throughout the year, even in cold climates, and of such substantial construction that they shall withstand weather conditions and rough usage without material injury or rapid deterioration. By our improved construction and through selection of appropriate materials, a structure of superior quality and appearance is produced, which through quantity production may be supplied at moderate cost, and erected by ordinary mechanics or even by inexperienced persons, with rapidity, and with the assurance of true lines and close air and water tight joints.

The novel structure is illustrated in the accompanying drawings, wherein.

Prior to our invention, so-called portable or "knock-down" buildings have been proposed, of varying structure and design, and various of them have been erected and used with more or less satisfactory results. As a general rule such prior structures have been designed for more or less temporary use and in mild weather, commonly for the purposes of summer camps and temporary homes. We aim to produce structures which may be advantageously used for like purposes, but which may also, when desired, be comfortably used for more permanent homes in cold climates and during severe weather.

A leading feature of our construction is that it permits utilization of relatively small pieces of wood, heretofore of little value and frequently thrown away or used as fuel, for the construction of unit frames. This enables us to keep the cost within reasonable limits, and yet to produce a durable structure, the woodwork being throughout protected by metal against the action of the elements.

Referring again to the drawings and first to Figs. 1 to 4 inclusive, the structure will be seen to comprise upright end and side walls formed of substantially identical units 1, 1ª and 1ᵇ; gables similarly formed of units 2; a roof formed of units 3 and 3ª; and a floor formed of units 4. The walls and floor rest upon a base or foundation 5, which may consist of wooden sills, cement, or the like, cross members 6 being employed at intervals to sustain the floor. Partitions may be provided if desired which, like the walls, roof and floor will be made up of identical units 7, with sheet metal upper portions 8. The wall and roof units are of like dimensions and construction, and the floor units are of the same dimensions as those of the wall and roof; hence all may be compactly stored or crated for shipment. The partition units may be mere panels of wood, fiber board, or wooden frames covered on one or both faces with sheet metal as are the wall and roof units. Their width will be the same as that of other units, but their length will ordinarily be somewhat less than said other units.

A leading feature of our construction resides in the manner of uniting, binding, or tying together the units constituting the walls, the floor, and the roof, and of making up the floor and tying it and the roof to the wall structure.

Wall construction.

Figures 12, 13, 14, 15:
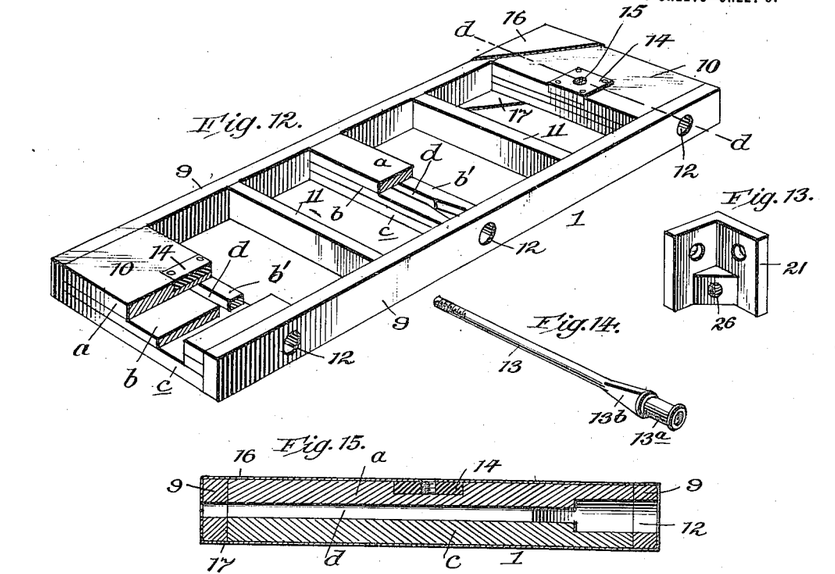
Fig. 12, a perspective view partly broken away, of one of the unit frames.
Fig. 13, a perspective view of an angle plate or fitting employed in the corner posts of the structure.
Fig. 14, a perspective view of one of the tie-rod sections or lengths.
Fig. 15, a section on the line *d—d* of Fig. 12.

For the purpose of making clear the manner of assembling the parts of the structure, it is desirable first to explain in detail the manner of constructing the several units. The wall units will first be described, reference being had to Fig. 12. As there shown each unit consists of a rectangular frame comprising longitudinal strips 9 connected at their ends and their midlength by cross members 10 composed each of layers of wood $a$ $b$ $b'$ and $c$. Of these layers the intermediate one is formed of two members $b$, $b'$, spaced apart to leave an intermediate opening or passage $d$ to receive a tie-rod or tie-rod section used for connecting and drawing firmly together the units constituting a wall or a roof section. Additional struts or cross members 11 may be employed if desired, to give greater stiffness to the frame, and better to maintain it against warping or getting out of shape.

The stiles or longitudinal members 9 are provided with openings 12 in alinement with the openings or passages $d$. The openings 12 in one stile of each frame are of cylindrical form and relatively large diameter, to receive the enlarged end portion of a tie-rod section 13, which section is made of the form and design best shown in Fig. 14. By referring to said figure it will be seen that the tie-rod section comprises a cylindrical rod of suitable diameter constituting the main body thereof, screw-threaded at one end, and having at the opposite end a spool-shaped enlargement $13^a$, tapped to receive the threaded end of a succeeding tie-rod section of like construction. The cylindrical body of the rod joins the head or enlargement $13^a$ by a portion $13^b$ of a thickness equal to the diameter of the main body of the rod, but flaring or increasing in width from the diameter of such body to that of the flanges or heads formed on the cylindrical end portion $13^a$. The flattened portion $13^b$ entering the space $d$ between the members $b$ and $b'$ of the cross members 10 of the unit-frame, holds the tie-rod section against rotation while another section is being screwed upon its threaded end. The flanged or spool-like form of the end $13^a$ affords comparatively large end faces for said extension, the outermost one of which forms a seat for a coiled spring hereinafter to be referred to, and applied when assembling the parts. The inner flange forms a limiting stop to prevent the end portion $13^a$ passing too far into the frame.

The end members 10 of the unit-frame have seated in one face midway between their ends metallic plates 14, secured by screws or other suitable fastenings, and having each a tapped central hole 15. The frame is covered on both faces and on its several edges with metallic sheets 16 and 17, galvanized sheet iron being preferably employed. The sheets are cut to proper dimension and bent over the side and end members 9 and 10, and are tacked or nailed thereto, openings being made in the sheet metal to correspond with the openings 12 and 15 of the stiles and the plates 14.

Preparatory to setting up a wall, and preferably before shipment from the factory, each unit is provided with tie-rod sections 13 introduced into the openings 12 and passed, small end foremost, through the openings $d$ to the farther edge of the unit. In setting up the wall, a suitable base or sill 5 is provided and several wall units, equipped as stated, are placed one after another so as to rest at their lower ends upon the sill or base, which is preferably formed with a ledge or shoulder below its top to receive the lower ends of the wall units. A first unit having been set up, say the lower left-hand one seen in Figs. 10 and 11, a packing strip 18 having perforations to register with the tie-rod sections, is applied to the upright edge of the unit, after which the protruding end of each rod section is provided with a washer 19 followed by an encircling coiled or spiral spring 20. This done, a second unit is rested upon the sill or base, and moved edgewise in plane with the first unit until it comes against or close to the packing strip of the preceding unit. The enlarged or socket ends $13^a$ of the tie-rod sections of the second unit are then screwed upon the protruding ends of the tie-rod sections of the first unit, thereby placing the first unit under compression. A third unit is then applied in precisely the same manner, each unit in turn being subjected to pressure or compression through the screwing of successive rod sections upon those of previous units, and against the several springs thereof, sufficient space being provided in the openings 12 and $d$ to permit ample longitudinal movement or adjustment of the tie-rod sections and of the completed tie-rods.

Figure 11:
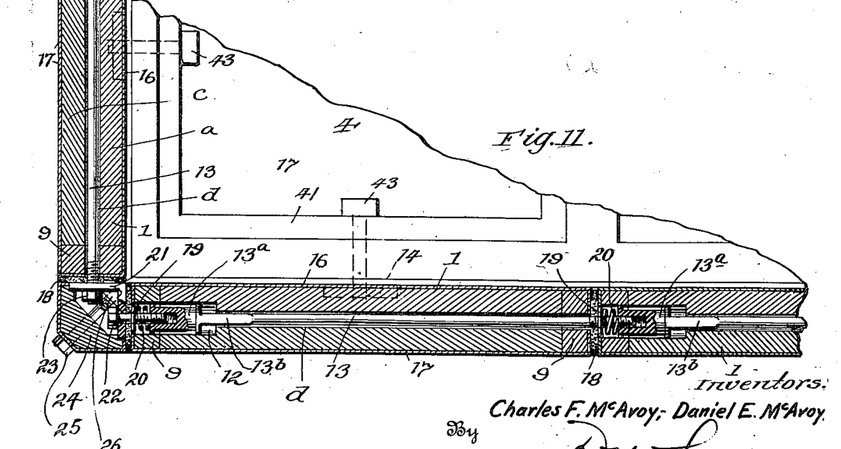
Fig. 11, an enlarged sectional view showing the corner construction and the tie-rods of the walls.

This operation is repeated until the last unit of the wall being erected is in place. There is then applied to each end of each of the completed sectional tie-rods an angle-iron 21 of the form shown in Fig. 13. The angle-iron 21 is secured to the enlarged end of the first rod section by means of a tap-bolt 22 passing through a perforation in one arm of the angle-iron 21, then through a packing strip 18 applied to the upright edge of the first unit 1, thence through a washer 19 and a coiled spring 20, and finally screwing into the tapped socket in the enlarged end 13$^a$ of the tie-rod section 13, as best seen in Fig. 11. At the opposite end of the wall as made up of the several units and connected by the sectional tie-rods, the threaded end of each sectional tie-rod passes first through a packing strip 18 applied to the upright edge of the last unit, and then through the second arm of the angle-iron 21, receiving on the outer side thereof a nut 23, as also shown in the lower left-hand corner of Fig. 11, where the final tie-rod section 13 of the front wall is seen.

The primary purpose of the springs 20 is to apply edge-wise pressure to each wall unit (and similarly to the roof units), independently of or additional to the ultimate compression incident to tightening up the tap-bolts 22 and nuts 23 at the ends of the sectional rods. This facilitates the proper bringing and holding together of the upright edges of proximate units, and compensates for expansion and contraction of the assembled units through atmospheric changes.

Figure 1:
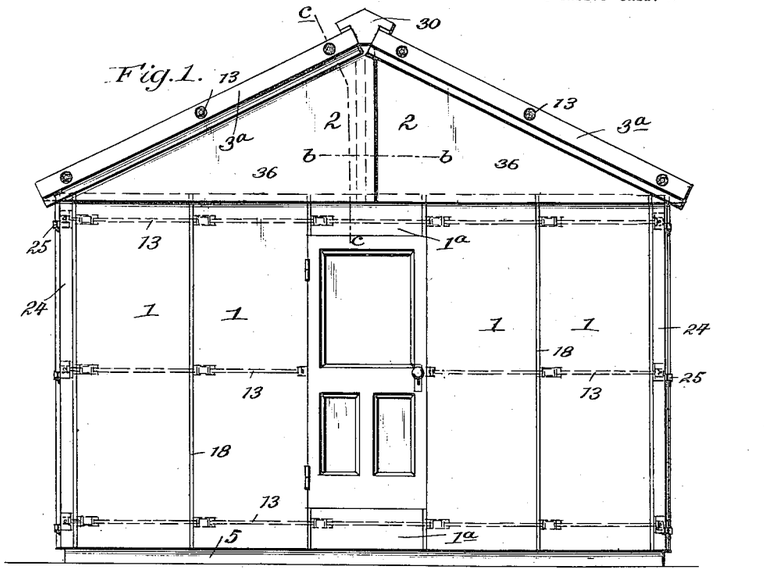
Figure 1 is an end elevation of a building constructed in accordance with our invention.

Obviously, continuous tie-rods could be employed, of proper length to reach from outside to outside of the end units of each wall and of each roof section. We prefer, however, the sectional rods for several reasons, to wit: The rod sections may be placed within their several units before being shipped, and thus be ready for instance use at the place of erection; they are not liable to be lost, and require no extra storage space during transportation; the rods may be built up to whatever length is required; and finally, the independent spring pressure is, through the peculiar construction of the rod sections, rendered possible for each separate unit.

Where a door is desired we employ only top and bottom filler pieces 1$^a$ such as shown in Fig. 1, or in others words, merely the top and bottom portions of the general wall units 1. Where a window is desired the unit is of the same construction and dimensions as other wall units, except that the space between the upper and middle cross members of the unit-frame is not cross braced, and the metal sheathing is cut out to leave an opening which is rabbeted to form a seat for the sash as indicated in the units 1$^b$, Figs 2 and 4.

To strengthen and give finish to the structure, corner-posts 24 are provided of substantially square cross section, but chamfered on the outermost corner and recessed on the inner corner to receive the angle-irons 21, as seen in Fig. 11. These corner-posts are of a length corresponding to the height of the wall units, and are covered on their outer faces with sheet metal as shown in said figure. The corner-posts are secured in place by tap-bolts 25 passing diagonally through them from the outer chamfered face toward the innermost corner, said bolts screwing each into a tapped hole or socket 26 formed in the angle-iron 21 whose socket 26 is in alinement with such bolt. The corner-posts not only give a finish to the structure and cover the angle irons 21, tap-bolts 22 and nuts 23, but also give greater rigidity to the structure.

After the side walls have been assembled or erected each is furnished with a longitudinal angle-iron bar or strip 27, which is made fast to the inner face of the wall by tap screws or bolts 28 passing through horizontal slots or elongated openings 29 in the vertical web of the angle iron 27, and entering tapped holes in the plates 14, which as before mentioned are secured at the mid-length of the upper cross members of the wall-unit frames. (See Figs. 4 and 7). The slots 29 permit the ready introduction of the screws or tapped bolts notwithstanding slight variations in the width of the wall units, should such occur, and also compensate for expansion and contraction of the units, which, however, will be very slight owing to the metallic covering of said units. The primary purpose of the angle bars 27 is to afford means for properly securing the roof in place, as will be presently explained.

It will of course be understood that windows or doors may be located wherever desired, the special units 1$^a$ or 1$^b$ being introduced at such points.

Roof construction.

The roof is of the double pitch or gable type which permits of the use of roof units 3 of the same construction and dimensions as the wall units, narrower roof units 3$^a$ being provided to produce the overhang at each end. The construction of the roof is illustrated in Figs. 3, 4, 6, 7 and 9. On referring to these figures the roof will be seen to consist of two main portions constructed in the same manner as the walls of the building, the outer edges or boundaries of said sections overhanging the side walls and resting upon packing strips 18 lying upon the upper edges of the walls, while the inner sides of the two roof sections are elevated to give the requisite pitch, and abut against an interposed ridge-pole 30 rabbeted on its under face to receive the edges of the roof sections and interposed packing, and to overhang said roof sections as shown.

Figures 6, 7, 8, 9:
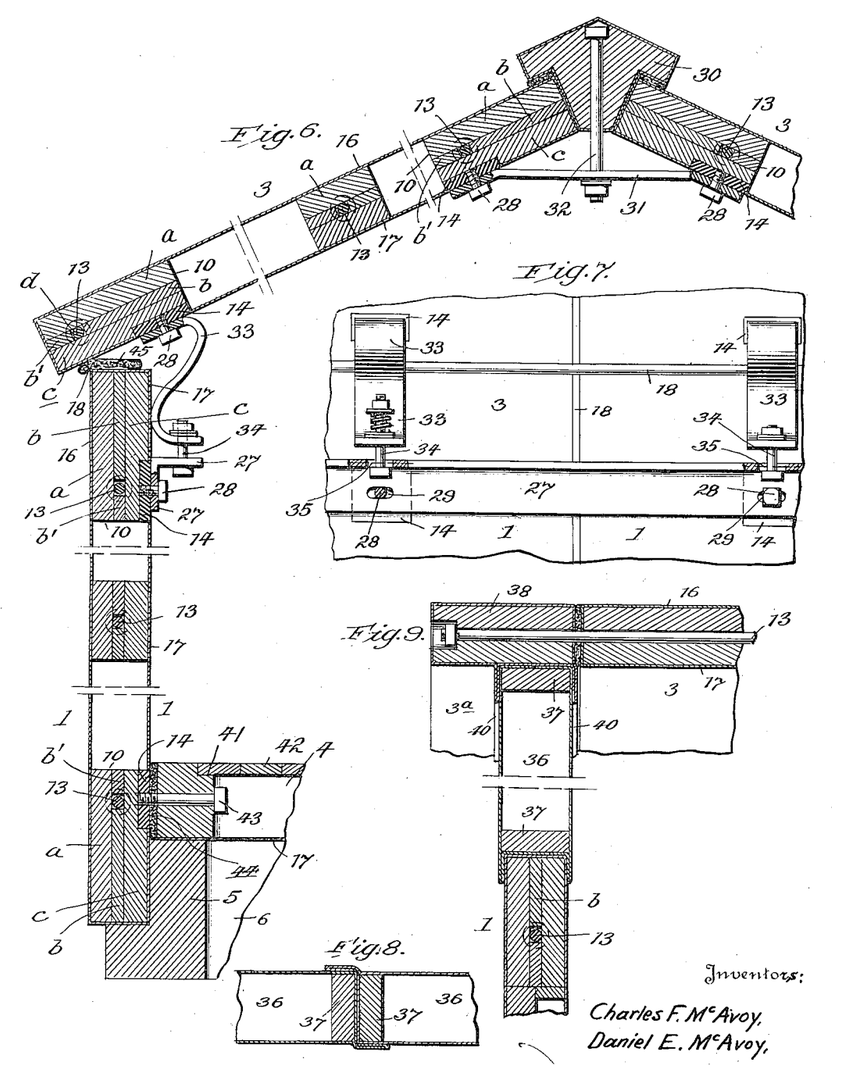
Fig. 6, an enlarged sectional view illustrating the construction of the base, floor, side wall and roof, the side wall and roof members being broken away to bring them within the limited space of the sheet.
Fig. 7, an inner face view of the upper part of the wall and lower part of the roof, showing the connections between the two, parts being in section.
Fig. 8, a section on the line *b—b* of Fig. 1.
Fig. 9, a section on the line *c—c* of Fig. 1.

The two roof sections, composed of units united by sectional tie-rods 13, are connected at intervals by metallic tie-bars 31 secured by tap-bolts 28 entering plates 14 carried by the roof units, in all respects the same as in the case of the wall units. Connection is made between the cross-ties 31 and the ridge-pole 30 by vertical bolts 32. The roof sections, cross-ties and ridge-pole form a species of truss, tending to hold the parts securely in the relation shown, particularly when the outer or lower portions of the roof sections are properly tied or anchored to the side walls. Such anchoring is effected by means of metallic straps or tie-members 33, preferably reversely bent as shown in Figs. 6 and to afford a limited amount of spring or give. Springs 32$^a$ may be used below the tie-bars 31.

The straps or tie-members 33 are perforated at each end and are connected to the roof sections by tap-bolts 28 screwing into the tapped holes of the plates 14 of the roof units, while their lower ends are connected with the angle iron bars 27 by bolts 34 passing through the straps 33 and through slots or elongated openings 35 in the horizontal web of said angle iron bar. The elongation of the openings 35 is for the same purpose as in the case of the openings 29; that is to say, it permits the ready introduction of the bolts 34 notwithstanding any slight variation in width of units, or any small displacement incident to expansion or contraction of units. The elasticity or slight play incident to the curvature of the straps 33 may be afforded or supplemented by a coiled spring encircling the bolt 34 between said strap and the nut applied to the upper end of the bolt, (or between the strap and the bolt head if that be uppermost), as shown at the left-hand side in Fig. 7. This insures a proper bearing of the roof sections on the wall sections, or on the interposed packing strip, at all points, and compensates for any slight irregularities that may exist. The straps 33 bear against the inner faces of the side walls and effectually prevent any tendency of the roof sections to move outward.

Figures 16, 17, 18:
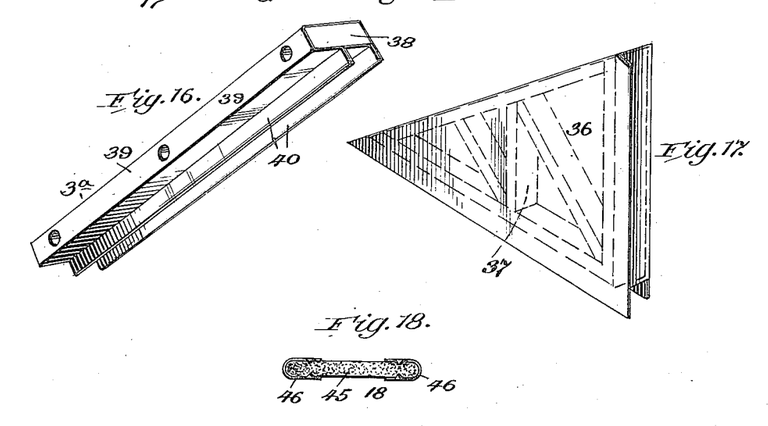
Fig. 16, a perspective view of one of the end sections of the roof.
Fig. 17, a perspective view of one of the gable sections.
Fig. 18, a transverse sectional view of the packing strips employed.

The gable ends of the structure are filled by unit sections or panels 36, which are alike in form and dimensions and are illustrated in Fig. 17. As shown in said figure each gable unit comprises a triangular frame 37 of wood covered by sheet metal, the covering sheets being carried below the frame on the inner and outer faces, to overlap the end walls both on the outside and the inside of the building, and also carried beyond the wide end of the gable unit to overlap the vertical joint where the two units meet. As the units are reversed, a single vertical lip or projecting end of the sheet metal covering on each unit is sufficient, since when their upright ends are brought together one lip will be on the inner and the other on the outer side of the gable, and the joint will hence be covered both on the inside and on the outside of the structure. A suitable packing strip will be used on all the narrow faces of the gable units, or between said units and the abutting faces of walls and roof.

The roof units 3$^a$ are of the construction shown in Fig. 16, and comprise either a solid or a framed wooden filler 38 having a sheet metal covering 39 formed with two depending folds or flanges 40 spaced apart to straddle the upper edge of a gable unit 36, and to extend down thereon sufficiently far to preclude the driving of rain or snow into the joint between them.

The gable units afford a firm support for the ends of the roof sections, and complete the end walls above the portion formed by the units 1.

*Floor construction.*

The floor, like the walls and roof, is of unit construction, and the units are of the same outside dimensions for each. To this end the length of each floor unit 4 is made an even multiple of its width, the proportions being here represented as three to one, though other relative dimensions may be adopted.

Figures 3, 5:
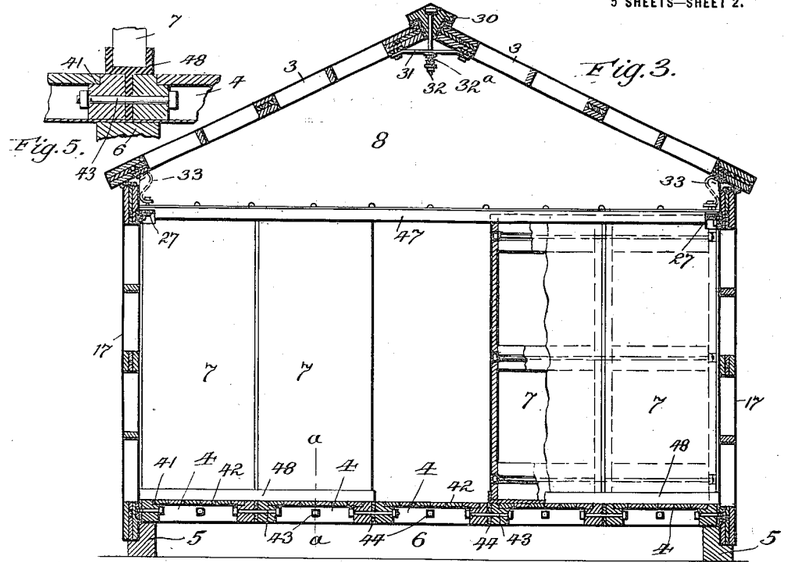
Fig. 3, a transverse vertical section showing a partition partly in section.
Fig. 5, a section on the line *a—a* of Fig. 3.
Figure 10:
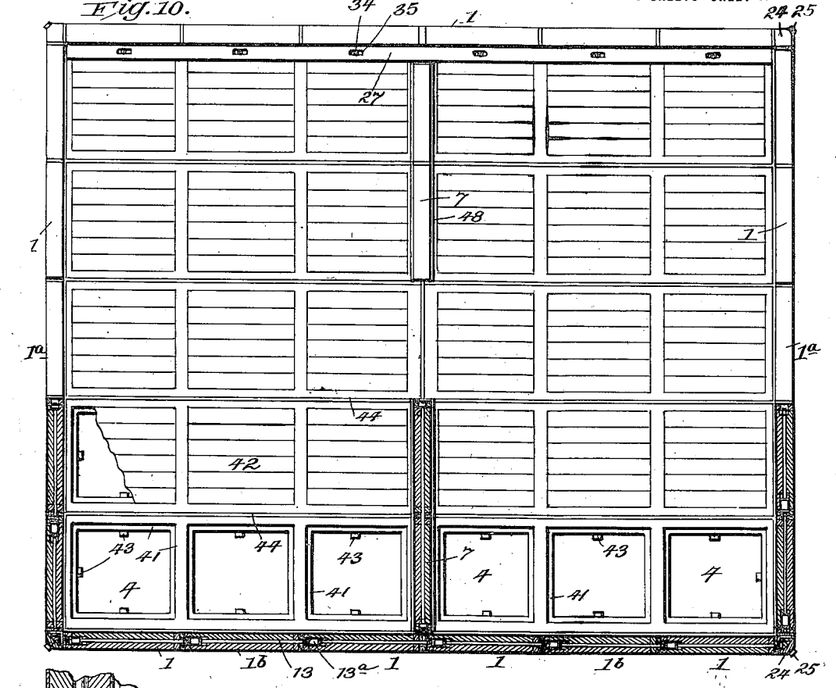
Fig. 10, a top plan view of the body or walls of the building showing said walls and partition partly in section, and some of the floor units without floor boards or fillers.

Each floor unit has a frame composed of stiles or longitudinal members and cross members, as in the case of the wall and roof units, but four cross members are preferably employed instead of the five commonly used for the roof and wall units. This with the relative dimensions stated, produces three square spaces in each frame of like dimensions. Each of these spaces is rabbeted as illustrated at 41 in Figs. 3, 4, 6, and 10, to receive filling panels 42 made up of short pieces of wood, as seen in Figs. 3, 6 and 10. This construction is adopted primarily because it permits the use of material which by reason of its small dimensions would commonly be thrown away. Incidentally, the appearance or effect produced is a pleasing one, and adds to the attractiveness of the completed structure. The under face of each floor unit is provided with a sheet metal covering 17 in the same way that both faces of the wall and roof units are covered.

The floor units are connected one with another by bolts 43 passing through proximate stiles or longitudinal members and through an interposed packing strip 44, and are secured to the walls of the structure by like bolts 43 entering the tapped holes or sockets in the plates 14 of the lower cross members of the wall units, as shown in Figs. 3, 4, 6 and 11.

The structure thus produced is quite rigid and might be used without other support, particularly as the outer boundaries of the floor rest upon the sill or base 5, but to guard against sagging of or undue stress upon the floor, or the units and their connections, it is preferred to use cross supports 6 as shown in Fig. 3 and above mentioned.

Packing strips.

The packing strips 18 and 44 are preferably of the form and construction shown in Fig. 18, comprising a strip 45 of felt or like compressible material of suitable thickness and width, the longitudinal edges of which are covered with thin U-shaped metal binding strips 46, preferably indented at intervals to maintain it in place. The binding strips serve not only to maintain the general shape of the packing strip and to protect the edges thereof, but produce when tightly clamped between the unit sections, a bead edge similar in appearance to the troweled cement of stone work, giving a very pleasing effect in the finished structure. This is particularly true where, as will frequently be the case, the metal sheathing of the different units is given a heavy coat of paint, and then sanded to simulate the appearance of stone. By the use of a like coating of paint with fine sand, the inner wall surfaces may be made to present the appearance of a well troweled mortar coat.

The partitions.

Where the structure is of a length sufficient to permit, it may be divided by transverse partitions made up of the units 7, into two or more separate rooms. To render this easy of accomplishment and better to tie together and prevent the spreading of the side walls, we adopt the construction illustrated in Figs. 3, 4 and 5.

Figure 4:
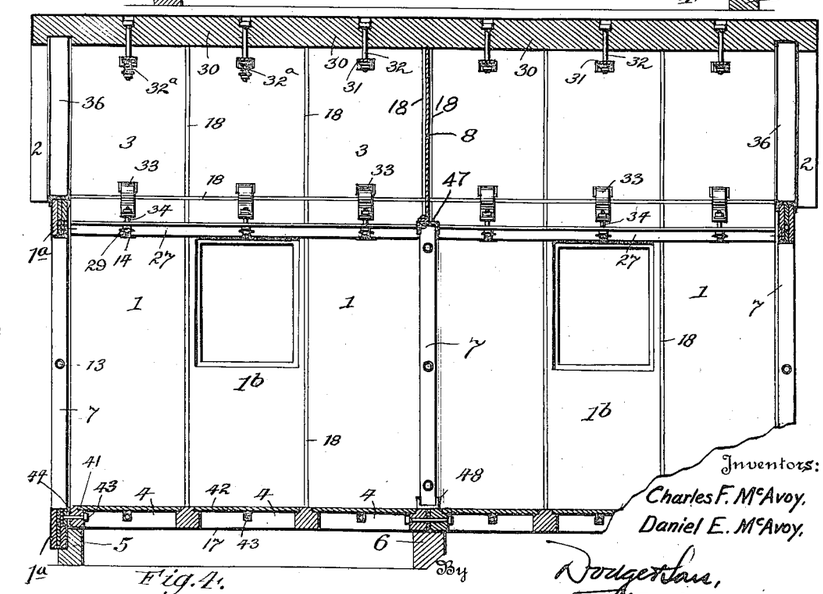
Fig. 4, a longitudinal vertical section taken through a doorway of the partition.

As shown in said Figs. 3 and 4, a channel-iron bar 47 forms a tie from the angle-iron bar 27 of one wall to the like bar of the opposite wall, and a channel bar 48 is placed at the floor in vertical plane with the channel bar 47, the bar 48 being provided with a depending web to be introduced and held between proximate ends of the floor units or sections, as seen in Figs. 4 and 5. If a doorway is to be left in the partition, the channel bar 48 will be interrupted, or its upwardly turned flanges will be omitted at such point. The partition units 7 may be mere boards or may be framed as are the wall and roof units, and tied together by tie-rods as shown in the right-hand side of Fig. 3.

Figure 2:
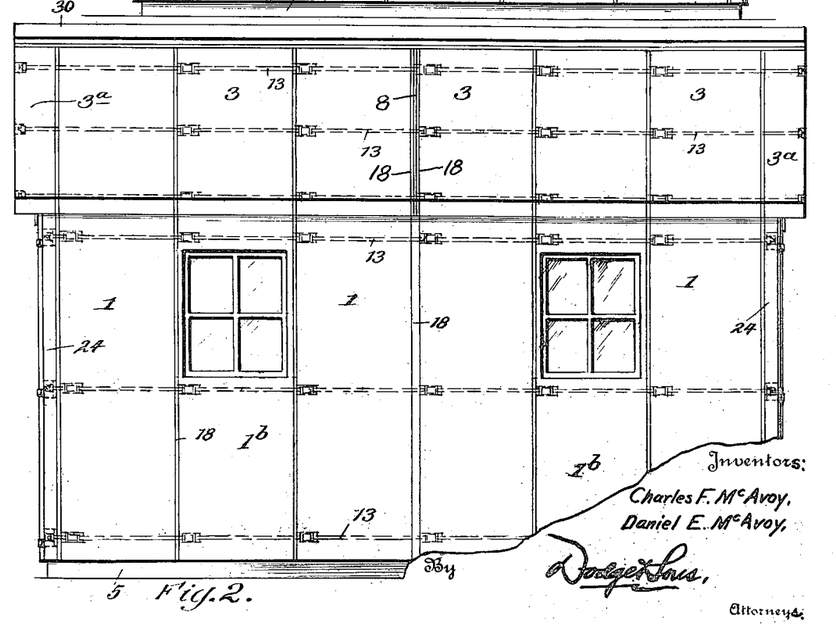
Fig. 2, a side elevation thereof, partly broken away.

The space above the partition is closed by a sheet metal panel or girder 8, the lower edge of which is turned at right angles to the body, and riveted or otherwise fastened to the channel bar 47, while its upper edges are carried and clamped between roof units, and if desired between two separate packing strips, or the two parts of a folded packing strip, of any suitable character, as seen in Figs. 2 and 4. The tie-rods of the roof pass through the panel or girder 8, and said girder and channel bar 47 very effectively tie together and strengthen the walls and roof sections adding greatly to the stability of the structure. A door will of course be provided for the door-way in the partition.

The air confined within the various units making up the structure is in itself a quite efficient insulator, tending to prevent transmission of heat and cold, and sufficient in moderate climates to produce a building that is warm in winter and cool in summer. If desired, however, a filling of mineral wool, asbestos fiber, or other good insulator may be employed.

Obviously, those faces of the wall and roof units which are to be exposed within the structure may be covered with plaster board in lieu of sheet metal, or both inner and outer faces may be covered with any of the various fiber or building boards now commonly used, the outer faces being painted or coated with a suitable preparation to render them waterproof and non-absorbent.

Where quantity production is required it is possible to manufacture the units entering into this structure very cheaply notwithstanding the exceptional or unusual quality and finish thereof, because there are but few unit parts or elements, all of which are of simple design and capable of production in large numbers by simple machinery, the parts being interchangeable one with another. The metallic fittings may be of steel, wrought iron, or malleable cast iron, and likewise produced at small cost when made in large quantities. The relatively simple units of which the structure is made up may be separately handled by workmen without difficulty, and no tools are required in assembling and connecting the parts other than a wrench and screw-driver.

As the units making up each main portion of the structure, as the walls, the floor, and the roof, are interchangeable within their respective fields, there is no liability of producing an imperfect structure in assembling the units as is the case where the units are not thus interchangeable, and must be assembled in predetermined and unvarying sequence or relation. The customary marking of units with consecutive numbers, letters, or the like, is not necesary under our construction, though of course it may be employed if desired.

It will be observed that the frame of each unit forms an arch, one end piece constituting the base or foundation, and the two longitudinal members and remaining end piece forming the arch resting upon such foundation or base, the whole tied together by the intermediate cross members and by the sheet metal casing or covering. The units are hence adapted to carry a heavy load, to withstand strong compression, and to prevent weaving or working due to high winds and the like. The tie-rods extending from corner to corner of the structure bind all parts firmly together, and the yielding supports and packing strips compensate for any expansion or contraction that may take place in the individual units. The tie-rods may be made sufficiently heavy to afford great strength, enabling the complete structure to be bodily moved in case of need. Sagging or opening of the roof under heavy loads of snow, sleet, and the like, is also effectually prevented, and though the structure is designed to be somewhat permanent, it possesses the capability of ready dismantling and reërection. The units being of uniform dimensions may be readily packed and shipped, and while we do not limit ourselves to specific dimensions, due regard will be paid to the dimensions of box cars and other transportation vehicles, so as to utilize to the best advantage the entire available space thereof.

While we have described the assembling of the walls by the erection of single units, an entire wall may be built up and then raised to its position on the sills or foundation. The same is true as to the two main roof sections. Where the structure is of considerable size, several units may be united and raised to position as one section.

It will be apparent that wings, L's, etc., may be constructed according to our described invention and combined as desired, thereby producing buildings of considerable size or capacity and convenient arrangement, and these may be given more attractive appearance by careful assembling and combining of the different elements.

Owing to the relatively small size of the figures in the drawing, the sheet metal covering 16, 17, is in Figs. 3, 4 and 10 represented by a solid black line, but is elsewhere shown sectioned or cross hatched.

It is of course obvious that more or fewer tie-rods may be used, though the units may have the passages $d$ formed in the three main cross connections of the frame even though fewer than three tie-rods be employed in a wall or roof section, thus adapting them to receive from one to three tie-rods as may be desired.

It will be seen from the foregoing description that the structure is composed of a series of units, packing strips, tie-rods, and connections, correlated in design and dimensions, and permitting rapid erection of buildings of various dimensions and arrangement of rooms, with a minimum of labor and that unskilled, and without any special fitting of the units or connecting devices after the same leave the factory.

It is particularly to be noted that under our construction each wall, roof and floor unit is a framed, double-walled, hollow structure, within which is confined a considerable body of air, sufficient to afford effective insulation against the transmission of heat and cold; that by reason of such framed construction and the relatively thick wall so produced, space is afforded for the passage of tie-rods of sufficient diameter to afford all necessary strength for tying together and subjecting to compression the series of units forming a wall or roof section; and that the various tie-rods are all concealed within the unit sections and thus protected from moisture and corrosion, and avoiding the unsightliness incident to exposed tie-rods, which would detract materially from the pleasing appearance of the structure. The unit sections thus differ materially from those formed of heavy planks arranged edge to edge and tied together by means of through bolts, a construction which necessitates the use of heavy lumber, unduly light tie-bolts, or both, and involves extra weight to be transported and handled, greater liability to warping, checking, etc., and produces a less attractive structure.

In Fig. 4 tie-bolts are shown connecting the end members of proximate floor units in the same manner as are the longitudinal stiles or members of said units.

Where wood is unobtainable or scarce, metal or other suitable material may be employed for making up the unit-frames.

Having thus described our invention what we claim is:—

1. A sectional building having walls each composed of a series of like framed, double-walled, hollow units in a common plane; and tie-rods extending from end to end of each wall through the several units, concealed therein, and holding said units under compression.

2. A sectional building, comprising upright walls and a roof, each consisting of a series of framed, double-walled, hollow units in a common plane; a series of tie-rods extending through the wall units from corner to corner of the structure; and a series of tie-rods extending through the roof units from end to end of the series, the said rods being concealed within and holding the wall and roof units under compression, the wall and roof units being alike and interchangeable.

3. In a sectional building, a series of similar units arranged in a common plane; tie-rods extending through said units from end to end of a series and formed of separate sections screw-connected end to end; and elastic bodies interposed between the end of each tie-rod section and the edge of a proximate unit; whereby each unit is independently subjected to initial edgewise pressure, and the pressure of all the units may be varied by tightening or loosening the end fastening of the completed rod.

4. In a sectional building, a series of similar units arranged in a common plane to form a wall; tie-rods extending through the several units from end to end of each series and serving to hold the units under compression, said rods being formed of separate sections united end to end and each having one enlarged end forming a bearing shoulder; and springs interposed between the enlarged end of each rod section and the frame of the proximate unit, and pressing against said unit; whereby each unit may be independently subjected to compression through turning the tie-rod section of the succeeding unit, and thereby compressing the spring between said rod section and the unit containing said spring.

5. In combination with a series of framed hollow-walled units constituting the wall of a building, tie-rod sections passing through the respective units and each having an enlarged end tapped to receive the threaded end of the adjoining section; and a spring encircling the threaded end of said adjoining section, abutting against the tapped end of the attached section, and serving to apply edgewise pressure to the unit against which it bears.

6. A unit for wall and roof construction, comprising a flat rectangular double-walled body of suitable dimensions provided with tie-rod sections passing between and hidden by its flat faces from one longitudinal edge to the other, each rod section being held against rotation in its wall unit, and provided with means of connection with like tie-rod sections of companion units.

7. A sectional building comprising a series of similar framed, double-walled units, those of each series arranged in common plane with their opposing edges slightly separated; compressible fillers or packing strips of a width substantially equal to the thickness of the units, interposed between said edges and provided with resilient metallic binding strips along their longitudinal edges; and tie-rods extending through the several units from end to end of each series, and serving to hold the units in alinement and under compression and to compress the filling strips, the bound edges of which protect the packing material and produce finished joints in simulation of the tooled cement joints of stonework.

8. In combination with upright walls, a roof comprising a series of unit sections arranged in a common plane; packing strips interposed between proximate edges of said units; a sheet metal girder having its upper edge embedded in one of the packing strips and arranged between proximate units; and tie-rods extending through the units of the series and through the girder, and serving to hold them and the interposed packing strips under compression.

9. In combination with the walls and floor of a sectional building, each comprising units arranged in a common plane, and interposed packing strips; a roof likewise comprising units arranged in a common plane, and intermediate packing strips; a sheet metal plate or girder having its upper edge embedded in the packing strip between proximate roof units, and its lower edge provided with a channel to receive a partition; and tie-rods extending through the several units of each series and serving to hold said units, interposed packing strips, and girder under compression.

10. A sectional building, comprising upright walls and a roof each composed of units in a common plane, intermediate packing strips, and tie-rods passing through the units of the respective series and serving to hold the same under compression; a sheet metal girder having its upper edge embedded in a packing strip between proximate roof units, and its lower edge provided with a trough or channel to receive the upper edge of a partition; a floor composed of unit sections; a channel bar having a web seated in a packing strip between proximate floor units, and serving to receive the lower edge of the partition; and a partition having its upper and lower edges seated in said channel bars.

11. In a sectional building of the character described, a roof girder consisting of a sheet of metal having its upper edges clamped and held between proximate roof sections, and its lower edge provided with a channel bar, the ends of which are secured to the side walls of the building.

12. In a sectional building and in combination with the walls thereof, a roof comprising two reversely inclined sections; a ridge-piece having a central portion the sides of which are substantially parallel with the proximate edges of the roof sections, and also formed with overhanging portions substantially parallel with the upper faces of said roof sections; tie-bars bolted to and connecting the roof sections; bolts extending from the ridge-piece to and through the tie-bars; springs encircling said bolts; and nuts applied to the bolts beneath the springs, substantially as described.

13. In a sectional building and in combination with the walls thereof, a roof comprising two reversely inclined sections; a ridge-piece having a central portion the sides of which are substantially parallel with the proximate edges of the roof sections, and also formed with overhanging portions substantially parallel with the upper faces of said roof sections; tie-bars bolted to and connecting the roof sections; bolts extending from the ridge-piece to and through the tie-bars; and nuts applied to said bolts.

14. In a sectional building and in combination with the walls thereof, a roof comprising two reversely inclined sections; a ridge-piece having a central portion the sides of which are substantially parallel with the proximate edges of the roof sections, and also formed with overhanging portions substantially parallel with the upper faces of said roof sections; packing strips interposed between the ridge-piece and the roof sections; slotted tie-bars bolted to and connecting the roof sections; bolts extending from the ridge-piece to and through the tie-bars; springs encircling said bolts; and nuts applied to the bolts beneath the springs, substantially as described.

15. In a sectional building and in combination with the walls thereof, a roof comprising two reversely inclined sections; a ridge-piece having a central portion the sides of which are substantially parallel with the proximate edges of the roof sections, and also formed with overhanging portions substantially parallel with the upper faces of said roof sections; slotted tie-bars bolted to and connecting the roof sections; bolts extending from the ridge-piece to and through the tie-bars; and nuts applied to said bolts, substantially as described.

16. In a sectional building, the combination of upright walls; a roof; packing strips interposed between the upper edges of the walls and the roof; angle irons secured to the walls; metallic straps secured to the roof; bolts connecting the angle irons and straps; and springs encircling the bolts and interposed between the nuts or heads of said bolts and the straps; whereby the roof is drawn down and caused to bear yieldingly upon the interposed packing strips.

17. In a sectional building, the combination of upright walls; a roof; packing strips interposed between the upper edges of the walls and the roof; angle irons secured to the wall and provided with openings elongated in the direction of the length of said angle irons; metallic straps secured to the roof; and bolts passing through the straps and the elongated openings of the angle irons, and serving to secure and maintain the roof in position.

18. In a sectional building of the character described, in combination, wall units provided on their inner faces with tapped plates; floor units each comprising a rectangular frame provided on its upper and inner edge with a rabbet and having a lower sheet metal bottom; bolts passed from the inside of the rectangular frames to and screwed into the plates of the wall units; and panels seated in the rabbeted spaces of the respective unit frames and readily removable to afford access to the fastening bolts.

19. A sectional building comprising four upright walls, each composed of a plurality of units arranged in a common plane and held under edge-wise compression by tie-rods extending through each series; angle irons connecting the tie-rods of adjoining wall sections; corner-posts adapted to fill the corner or angle at the meeting points of adjoining walls; and bolts passing through said corner-posts and into the angle irons for holding said posts in place and binding the several parts together.

20. A unit for the construction of wall and roof sections of buildings, comprising a rectangular frame formed of two parallel longitudinal stiles or members and interposed cross members, said cross members being provided each with a passage extending from the outside of one stile to the outside of the companion stile and enlarged at one end to receive a tie-rod having one enlarged end, the frame being covered on both faces with sheet metal.

21. In combination with a wall or roof unit having longitudinal and transverse frame members, the latter each provided with a passage extending from the outer face of one longitudinal member to the outer face of the other longitudinal member and enlarged at one end; tie-rod sections each comprising a rod threaded at one end, and provided with a tapped spool-like enlargement at the opposite end and an intermediate flat section flaring from the body of the rod to the circumference of the spool-like enlargement, said rod sections seated in the passages through the several transverse members.

22. A unit section for buildings, comprising a rectangular frame having near each end on one face a tapped plate, and provided with transverse passages for tie-rods, said frames being covered on both faces with sheet metal.

In testimony whereof we have signed our names to this specification.

CHARLES FREDERICK McAVOY.
DANIEL EDWARD McAVOY.